United States Patent
Scheidmantel et al.

(10) Patent No.: US 6,213,538 B1
(45) Date of Patent: Apr. 10, 2001

(54) ARMREST AND METHOD OF FABRICATING SAME

(75) Inventors: David A. Scheidmantel, Rockford; Robert H. Versaw, Jr., Muskegon, both of MI (US)

(73) Assignee: Leon Plastics, Inc., Grand Rapids, MI (US)

( * ) Notice: Subject to any disclaimer, the term of this patent is extended or adjusted under 35 U.S.C. 154(b) by 0 days.

(21) Appl. No.: 09/389,971

(22) Filed: Sep. 3, 1999

Related U.S. Application Data

(60) Provisional application No. 60/099,649, filed on Sep. 9, 1998.

(51) Int. Cl.[7] .................................................. B60J 9/00
(52) U.S. Cl. ......................................................... 296/153
(58) Field of Search ............................................. 296/153

(56) References Cited

U.S. PATENT DOCUMENTS

| | | |
|---|---|---|
| 2,601,677 | 6/1952 | Wettlaufer . |
| 2,633,186 * | 3/1953 | Jeckell . |
| 2,661,052 | 12/1953 | Bushhong . |
| 2,703,602 | 3/1955 | Greenstadt . |
| 2,914,119 | 11/1959 | Keefe, Jr. . |
| 3,279,853 | 10/1966 | Cromwell et al. . |
| 3,387,881 | 6/1968 | Stepanek et al. . |
| 3,620,566 | 11/1971 | Leconte . |
| 4,659,135 * | 4/1987 | Johnson ............................ 296/453 |
| 4,667,979 * | 5/1987 | Wolff ................................. 280/752 |
| 4,783,114 * | 11/1988 | Welch ............................... 296/153 |
| 4,869,543 | 9/1989 | Grimes . |
| 5,181,759 * | 1/1993 | Doolittle ........................... 296/153 |
| 5,290,087 | 3/1994 | Spykerman . |
| 5,951,094 * | 9/1999 | Konishi et al. ................... 296/153 |

* cited by examiner

*Primary Examiner*—D. Glenn Dayoan
*Assistant Examiner*—Mickki D. Murray
(74) *Attorney, Agent, or Firm*—Rader, Fishman, Grauer & McGarry

(57) ABSTRACT

An armrest adapted to be mounted to a vehicle door comprises a primary substrate adapted to be mounted to a vehicle door panel with a secondary substrate mounted to the primary substrate and defining a recess. A foam layer is mounted to the secondary substrate within the recess, and a flexible outer casing integrally molded to the primary substrate forming a recess with the primary substrate which receives the secondary substrate and the foam layer. A method of fabricating the armrest for the vehicle door is also provided.

63 Claims, 3 Drawing Sheets

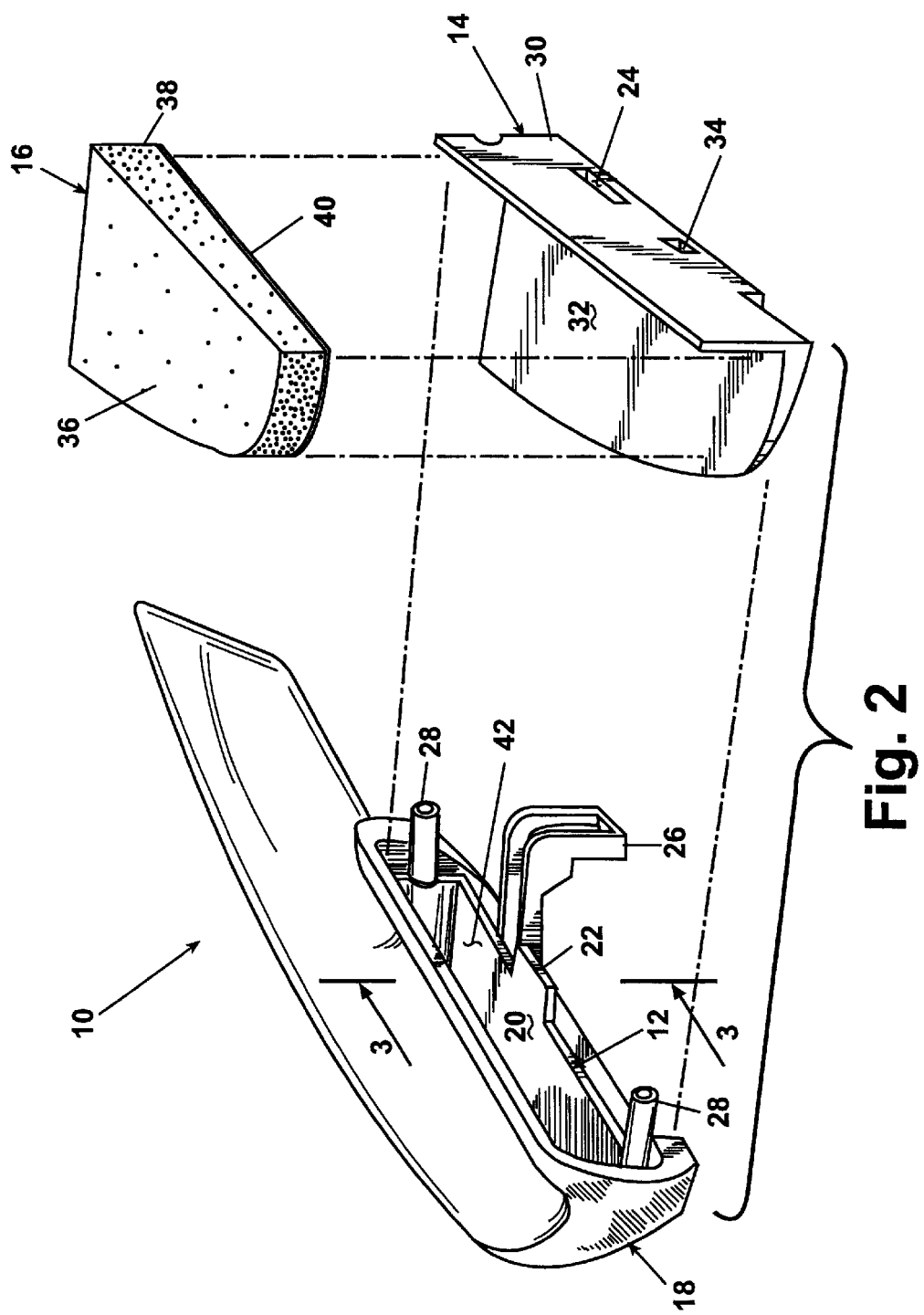

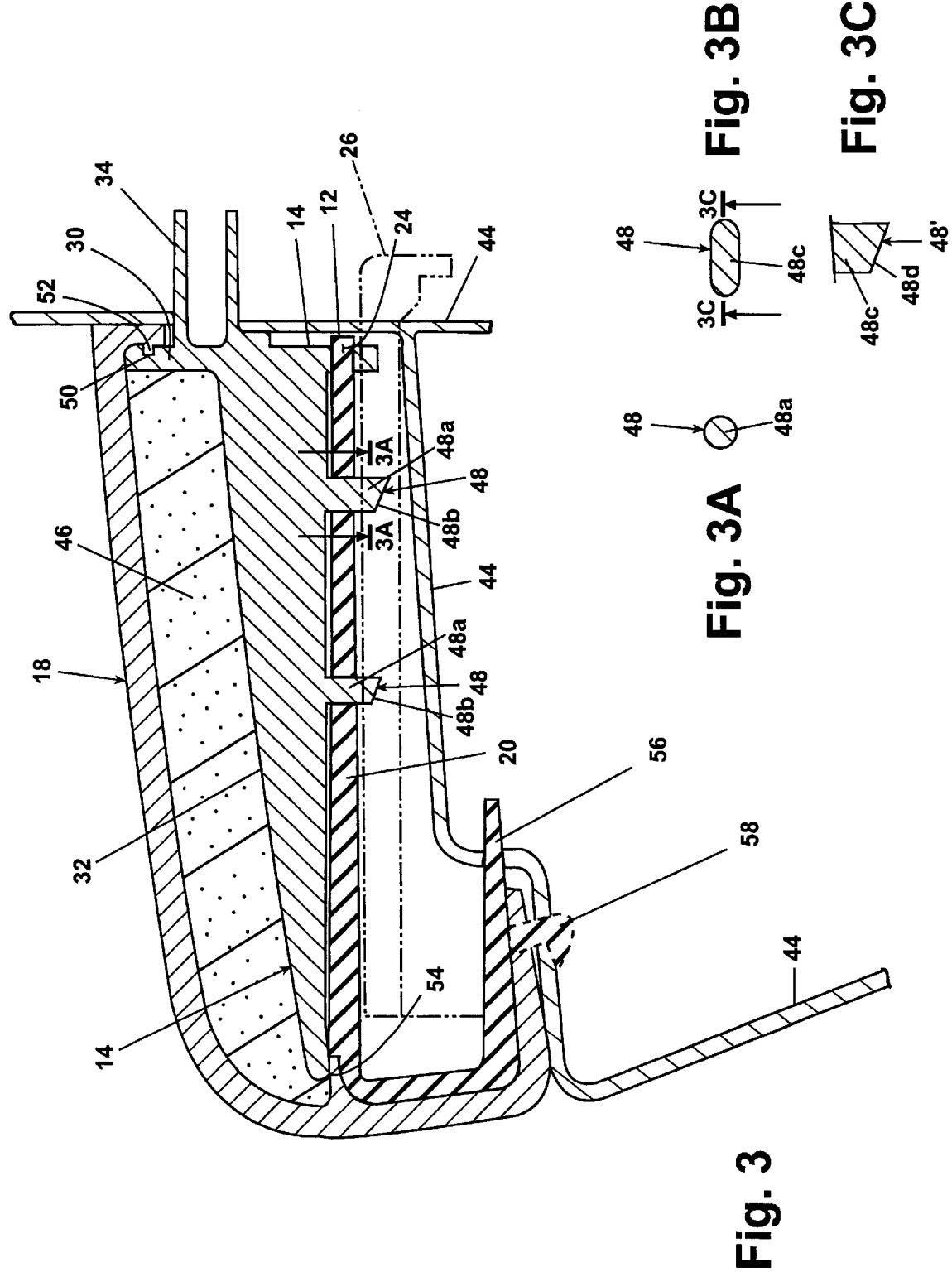

ARMREST AND METHOD OF FABRICATING SAME

CROSS-REFERENCE TO RELATED APPLICATION

This application claims the benefit of U.S. patent application Ser. No. 60/099,649, filed on Sep. 9, 1998.

BACKGROUND OF THE INVENTION

1. Field of the Invention

This invention relates to a vehicular armrest, and more particularly, to an armrest having a structural substrate, a vinyl or flexible polyolefin covering and a foam filling between the substrate, secondary substrate 14 and cover and the vinyl covering. The invention also relates to a process for fabricating the vehicular armrest.

2. Related Art

Armrests filled with polyurethane foam resins have been mounted on vehicle doors for many years. An example of a prior art armrest 110 is shown in FIG. 1 comprising a structural plastic or metal internal support 112 having a substrate surface 120, a vinyl or flexible polyolefin outer cover 118 and a polyurethane or similar foam filling 146 enclosed within the internal support 112 and cover 118 by a panel 114.

While such conventional foam materials have been readily utilized in the industry, problems have been identified with respect to, among other things, the consistency of their reaction profiles. For example, armrests 110 are conventionally filled with a two-part polyurethane foam. Polyurethanes are generically prepared by nucleophilic addition of alcohols to isocyanates. Foaming occurs when a small amount of water is added to the two chemical reagents during polymerization. Specifically, water adds to the isocyanate groups providing carbamic acids, which spontaneously lose carbon dioxide, thus generating bubbles and, in turn, foam within the curing polymer.

When the polyurethane foam 146 is poured into the armrest 110 during the initial stages of polymerization the reagents are still susceptible to parameter changes such as atmospheric moisture (humidity), temperature, and pressure changes. These parameter changes can have a substantially adverse impact upon the consistency of the resulting foam 146 from day to day or even batch to batch. Furthermore, according to conventional methods, after the two-part polyurethane foam 146 has been poured and cured, copious quantities of scrap remain, which requires additional time and labor to clean up and, in turn, adds to the cost of production. Moreover, the disposal of the scraps and byproducts from synthesizing polyurethanes can be costly.

In addition, due to the complexity, smell, and messiness of preparing polyurethane foams, it is typically not practical for the armrest 110 to be assembled in one location as the preparation of the foam 146 requires and additional, separate work station which further adds to the cost of manufacturing. Further, the polyurethane foams 146 are not recyclable and thus the armrests 110 are not recyclable when the automobile is eventually scrapped.

SUMMARY OF THE INVENTION

In one aspect, the invention relates to an armrest adapted to be mounted to a vehicle door comprising a primary substrate adapted to be mounted to a vehicle door panel and a secondary substrate mounted to the primary substrate and defining a recess. A foam layer is mounted to the secondary substrate within the recess, and a flexible outer casing is integrally molded to the primary substrate forming a recess with the primary substrate which receives the secondary substrate and the foam layer.

The primary substrate and the secondary substrate can be formed of a thermoplastic material and the secondary substrate is heat fuised to the primary substrate. The heat fusing can comprise heat staking. The foam layer can be adhesively secured to the secondary substrate. The foam layer can be unsecured to the flexible outer casing. The flexible outer casing can be a molded thermoplastic material. The molded thermoplastic material can comprise a vinyl resin. The secondary substrate can have a depending flange with an opening and the primary substrate can have an alignment tab positioned in the opening. The secondary substrate can have a second opening and the primary substrate can be heat staked to the secondary substrate through the second opening. The secondary substrate can have at least one depending locator pin and the primary substrate can have at least one opening which receives the at least one depending locator pin. The secondary substrate can have a wedge-shaped platform which has an upper surface which receives the foam layer. The foam layer can have a substantially uniform thickness. The foam layer can be formed of a vinyl resin which is die cut. The secondary substrate can have a generally vertical wall with at least one flange extending rearwardly therefrom, wherein the at least one flange is adapted to locate the armrest in an opening on a vehicle door. The components of the armrest can be formed from recyclable materials. The primary substrate can have a flexible depending detent arm adapted to locate the armrest within an opening on a vehicle door. The outer casing can have a tab on an interior surface thereof which extends between a portion of the primary substrate and the secondary substrate whereby the tab wedges between the substrates and reduces vibratory noise therebetween.

In another aspect, the invention relates to a method of fabricating an armrest for a vehicle door comprising the steps of forming a primary substrate adapted to be mounted to a vehicle door panel; intergrally molding a flexible outer casing to the primary substrate and forming a recess therewith; forming a secondary substrate having a mounting platform with a shape adapted to occupy a lower portion of the recess; forming a foam layer having a shape adapted to occupy the remainder of the recess between the mounting platform and the outer casing; mounting the foam layer to the mounting platform of the secondary substrate; and inserting the assembly of the foam layer and the secondary substrate into the recess defined by the primary substrate and the outer casing.

The elements produced by the above method can have the features described above with respect to the armrest. Further, the method can include the steps of heat fusing and/or heat staking the secondary substrate to the primary substrate; mounting the foam layer to the secondary substrate and adhesively securing the foam layer to the secondary substrate; inserting a portion of the primary substrate into a portion of the secondary substrate to align the primary and secondary substrates with respect to one another; heat fusing the primary substrate to the secondary substrate; heat staking the primary substrate to the secondary substrate through an opening in the secondary substrate; inserting at least one depending locator pin on the secondary substrate into at least one opening in the primary substrate; and die cutting the foam layer.

The mounting platform can have a wedge shape from a rear portion to a front portion thereof for facilitating the step of inserting the assembly of the foam layer and the secondary substrate into the recess defined by the primary substrate and the outer casing. The foam layer can have a substantially uniform thickness.

Other objects, features, and advantages of the invention will be apparent from the ensuing description in conjunction with the accompanying drawings.

BRIEF DESCRIPTION OF THE DRAWINGS

In the drawings:

The invention will now be described with reference to the drawings wherein:

FIG. 2 is an exploded perspective view of a first embodiment of an armrest in accordance with the present invention utilizing a die-cut vinyl nitrile or polyolefin-based foam;

FIG. 3 is a cross-sectional view of the armrest of FIG. 2 taken along lines 3—3;

FIG. 3A is a cross-sectional view of a first embodiment of a mounting post employed with the armrest of FIG. 1 taken along lines 3A—3A of FIG. 3;

FIG. 3B is a cross-sectional view of a second embodiment of the mounting post employed with the armrest of FIGS. 2–3;

FIG. 3C is a cross-sectional view like FIG. 3A taken along lines 3C—3C of FIG. 3B;

DETAILED DESCRIPTION

Figure 1:
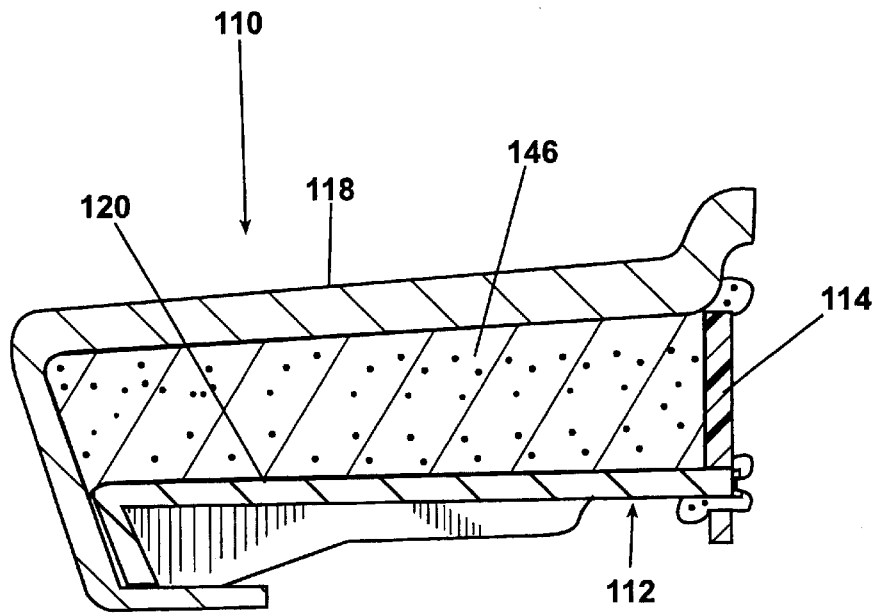
FIG. 1 is a cross-sectional view of a prior art armrest filled with a two-part polyurethane foam.

Referring now to the drawings and to FIG. 2 in particular, a first embodiment of an armrest 10 is shown which generally comprises a primary substrate 12, a secondary substrate 14, a die-cut foam filler 16, and an outer casing 18.

As best shown in FIGS. 2–3, the primary substrate 12 provides for the general structure and contour of the armrest 10, and can be configured in any one of a number of shapes. The primary substrate 12 includes a substantially planar ridge 20 for receiving the secondary substrate 14. The primary substrate 12 further includes an alignment tab 22 which emanates outwardly from the planar ridge 20 and which is received, upon assembly, by a slot 24 of the secondary substrate 14 to facilitate proper transverse alignment between the primary and secondary substrates 12 and 14.

The primary substrate 12 further includes an L-shaped member 26 emanating substantially outwardly and downwardly proximate the lower surface of the planar ridge 20. The L-shaped member 26 is used in two capacities. First, the L-shaped member 26 is used to align the armrest 10 with an aperture of a vehicle door 44 (shown in FIG. 4). Second, the L-shaped member 26 adds stability to the armrest 10, once the armrest 10 is secured to the door 44.

Moreover, the primary substrate 12 includes a plurality of fastener receivers 28 for receiving fasteners, such as, but by no means limited to, threaded screws to, in turn, secure the armrest 10 to the door of a vehicle. The fastener receivers 28 are shown by example in FIG. 2 as comprising a molded cylindrical boss having a longitudinal threaded bore therein.

The primary substrate 12 is preferably fabricated from glass filled polypropylene. However, any one of a number of materials can be used to fabricate the primary substrate 12 including, but by no means limited to, wood, steel and various metallic alloys, and numerous other synthetic resin compounds. Of course, the precise fabrication materials used will depend upon the particular qualities desired such as price, weight, strength, durability, or any combination thereof.

The secondary substrate 14, as shown in FIGS. 2–3, comprises a generally vertical cover 30 having a slot 24 adapted to receive the tab 22 of the primary substrate 12 upon assembly. In addition, the vertical cover 30 has a second slot 34 adapted to receive a heat-staking tool upon final assembly of the armrest 10 to mount the secondary substrate 14 to the primary substrate 12. As best shown in FIG. 3, the vertical cover 30 preferably has a locking groove 50 adjacent an upper edge thereof which creates a channel to secure outer casing 18 thereto—which has a casing bead 52 adapted to snap-fit within the locking groove 50. This locking feature prevents the outer casing 18 from distorting when mounted in abutment to the door panel 44.

A mounting platform 32 emanates substantially perpendicular from the generally vertical cover 30. The mounting platform 32 is generally planar and geometrically conforms to the planar ridge 20 of the primary substrate 12. As shown in FIG. 3, the mounting platform 32 preferably has a tapering wedge-shaped cross-section.

The mounting panel 32 of the vertical cover 30 also preferably includes a number of locators 48 which facilitate proper alignment between the primary substrate 12 and the secondary substrate 14. The locators 48 accurately position the secondary substrate 14 with respect to the primary substrate 12 for different vehicles and to lock the secondary substrate thereto after assembly. The locators 48 can be integrally molded with the L-shaped member 26 as desired when design constraints permit.

FIGS. 3–3A show a first embodiment of the locator 48 in detail comprising a cylindrical member 48a having a ramped distal surface 48b thereon. FIGS. 3B–3C show a second embodiment of a locator 48' in detail comprising an elongated member 48c having an elliptical or rounded rectangular cross section and also having a ramped surface 48d thereon.

The secondary substrate 14 is preferably fabricated from acrylonitrile butadiene styrene (ABS) polymers or a polyolefin-based resin. However, any one of a number of materials can be used to fabricate the secondary substrate 14 including, but by no means limited to, wood, steel and various metal alloys, and numerous other synthetic resin compounds.

The foam filler 16 provides a "spongy" feel to an occupant who places his/her arm upon the armrest 10. The foam filler 16 includes an upper surface 36 and a lower surface 38. Applied to the lower surface 38 of the foam filler 16 is a conventional pressure sensitive adhesive. Prior to final assembly, the adhesive is protected with a paperboard covering 40. The surface of the paperboard covering 40 that contacts the pressure sensitive adhesive is coated with a conventional material to preclude adhesion between the foam filler 16 and the paperboard covering 40. While the pressure sensitive adhesive has been disclosed as applied to the foam filler 16, for illustrative purposes only, it is likewise contemplated that the adhesive can be applied to the mounting platform 32 of the secondary substrate 14.

The foam filler 16 is preferably die-cut to conform to the geometric configuration of both the mounting platform 32 of the secondary substrate 14 as well as the planar ridge 20 of the primary substrate 12. The foam filler 16 is preferably fabricated from vinyl nitrile resins. However, any one of a number of polymeric resins, such as EPDM, polypropylene, polyethylene, etc., are likewise suitable for use. The vinyl nitrile resins are preferred for at least two reasons. First, the vinyl nitrile cured resins are ideal for conventional die-cutting. As such, all components of the armrest can be collected and assembled in one final assembly location which, in turn, reduces the cost of production. Second, the vinyl nitrile cured resins result in a foam that is especially spongy which gives the armrest a softer feel when a occupant rests his/her arm upon the region having such a foam filler.

The outer casing 18 is molded to generally conform the geometric configuration of the primary and secondary substrates 12 and 14 collectively—when assembled. The outer casing 18 is preferably fabricated from polyvinyl chloride (PVC). However, any one of a number of conventional casing materials are likewise contemplated for use including known thermoplastic polyolefin-based elastomers, for example.

As best shown in FIG. 3, the outer casing 18 is also provided with an outer tab 54 which extends inwardly therefrom to nest between the primary substrate 12 and an outer edge of the secondary substrate 14. The outer tab 52 effectively functions as a wedge between the primary and secondary substrates 12 and 14 and the outer casing 18 to prevent noise from being generated within the armrest 10 during use as a result of vibration of the vehicle.

As will be readily apparent from the description below, the armrest 10 in accordance to the present invention is suitable for final assembly in one location using only a limited number of nominal manual steps.

To initiate assembly of the armrest 10, the primary substrate 12 is placed in a mold conforming to the geometric configuration of the outer casing 18. The outer casing 18 is then applied over the primary substrate 12 by injecting outer cover material into the mold. Such a process is conventionally known as "insert molding" or "over molding." As best shown in FIG. 2, once the outer cover material is cured, the partially fabricated armrest includes a channel 42 for receiving both the secondary substrate 14 and the foam filler 16.

Upon further assembly, the paperboard covering 40 of the foam filler 16 is removed thus exposing the pressure sensitive adhesive which is applied to the lower surface 38 of the foam filler 16. Once the paperboard material 40 is removed, the lower surface 38 having the pressure sensitive adhesive, is fixedly applied to the upper surface of the platform 32 of the secondary substrate 14. Next the secondary substrate 14, with the applied foam filler 16, is inserted into the channel 42. To assure proper alignment, the slot 24 of the secondary substrate 14 receives the tab 22 of the primary substrate 12 upon such an insertion.

In addition, the locators 48 on the secondary substrate 14 can be positioned within corresponding apertures or openings in the primary substrate for further location assistance between the two substrates 12 and 14. The ramped surface 48b on the locators assist insertion of the locators 48 within the openings in the primary substrate 12 by allowing the secondary substrate 14 to slide relative to the primary substrate 12 in an angular fashion and then allowing pivoting to an abutted relationship when the proper alignment is obtained.

After the secondary substrate 14 is fully inserted into the channel 42, assembly of the armrest 10 is completed by fusing together the primary and secondary substrates 12 and 14, respectively. Fusion of the two substrates is preferably accomplished by inserting a conventional heat staking tool into and through the slot 34 of the secondary substrate 14 thereby contacting a portion of both the primary and secondary substrates 12 and 14, respectively, and, in turn, fusing the two substrates 12 and 14 together. While conventional heat staking has been described herein, for illustrative purposes only, any one of a number of "fusing" and/or "sealing" procedures known to those having ordinary skill in the art are likewise contemplated for use. Attachment could also be accomplished via screws, rivets, adhesives etc.

As shown in FIG. 3, upon complete assembly of the armrest 10, the die-cut foam filler 16 is wedged between the secondary substrate 14 and the outer casing 18. The die-cut foam filler 16 does not contact the planar ridge 20 of the primary substrate 12. In comparison with the prior art armrest assembly shown in FIG. 1, [a] the fully assembled prior art armrest thereof (utilizing a poured polyurethane filler 146) does, indeed, contact the planar ridge 120 of the primary substrate 112.

Figure 4:
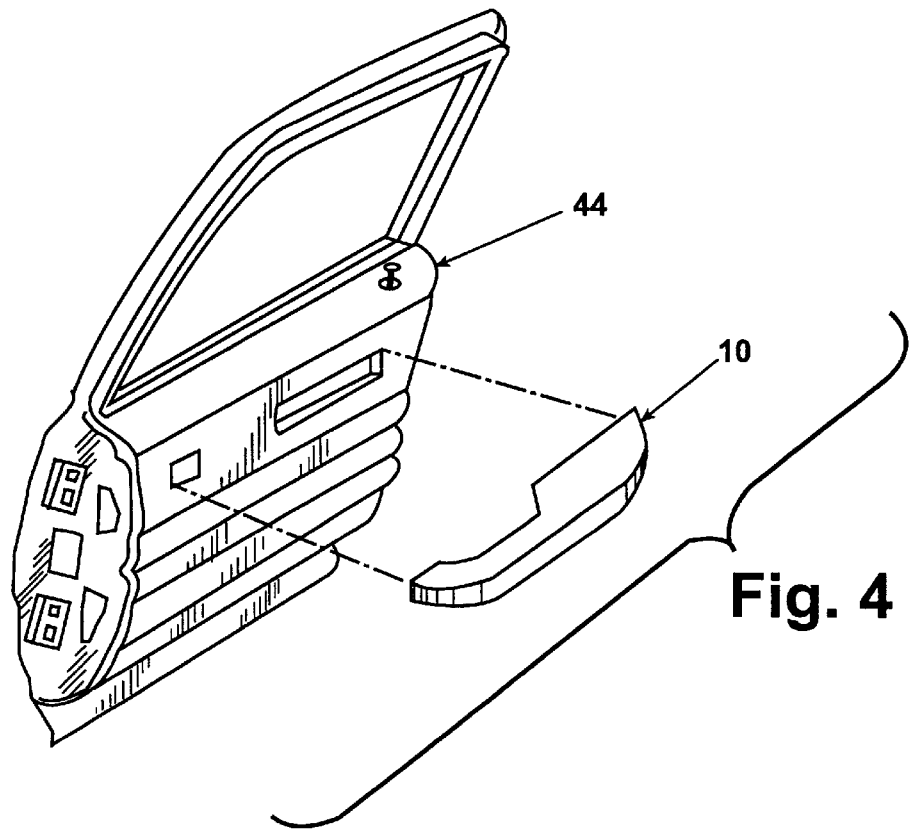
FIG. 4 is an exploded perspective view of a vehicle door being assembled with an armrest in accordance with the present invention.

As shown in FIGS. 3–4, after the armrest 10 of the present invention is fully assembled, it is then ready for attachment to a door 44 of a conventional vehicle. To attach the armrest 10 to the vehicle door 44, a plurality of fasteners are fixedly received into the fastener receivers 28 of the primary substrate 12. Further, to increase the location and appearance of the armrest 10 when it is mounted to the vehicle door 44, the primary substrate 12 can be provided with a reversely-extending blade 56 which has a depending detent arm 58 thereon. The detent arm 58 is adapted to engage within an opening on the vehicle door 44 and is preferably biased to draw the armrest 10 and vehicle door 44 together. In this manner, the detent arm 58 on the blade 56 is used to control the appearance gap of the armrest 10 relative to an exterior panel of the vehicle door 44 by acting as vertical locator of the armrest 10 to the door 44. The detent arm 58 also assists the assembly of the armrest 10—for example, the detent arms 58 on the blade 56 can be temporarily mounted to an arm on a manufacturing assembly to allow the armrest 10 to be easily handled prior to fusing the substrates 12 and 14 together at the assembly plant.

It should also be noted that where a flexible polyolefin-based outer cover is used in conjunction with a polyolefin-based foam 16 and primary and secondary substrates 12 and 14, the resultant armrest 10 assembly is completely recyclable. This is due to the compatibility of the components making up the armrest 10. Thus, even if the armrest 10 is scrapped after its useful lifetime, the components 12–16 of the armrest 10 can be recycled.

While particular embodiments of the invention have been shown, it will be understood, of course, that the invention is not limited thereto since modifications may be made by those skilled in the art, particularly in light of the foregoing teachings. Reasonable variation and modifications are possible within the scope of the foregoing disclosure of the invention without departing from the spirit of the invention.

What is claimed is:

1. An armrest having an arm-supporting upper surface and adapted to be mounted to a vehicle door comprising:

a primary substrate adapted to be mounted to a vehicle door panel;

a secondary substrate mounted to the primary substrate and including a mounting platform thereon in alignment with the upper surface of the armrest;

a foam pad of substantially uniform thickness and die cut from a foam sheet also of the substantially uniform thickness, wherein the foam pad is mounted to the mounting platform of the secondary substrate within the recess; and a flexible outer casing integrally molded to the primary substrate forming with the primary substrate a recess which receives the secondary substrate and the foam pad and also forms the upper surface of the armrest;

whereby the foam pad defines a contour for the upper surface of the armrest as a result of the generally uniform thickness of the foam pad.

2. The armrest of claim 1 wherein the primary substrate and the secondary substrate are formed of a thermoplastic material and the secondary substrate is heat fused to the primary substrate.

3. The armrest of claim 2 wherein the heat fusing comprises heat staking.

4. The armrest of claim 3 and further comprising an adhesive disposed between the foam pad and the secondary substrate to secure the foam pad to the secondary substrate.

5. The armrest of claim 4 wherein the foam pad is unsecured to the flexible outer casing.

6. The armrest of claim 5 wherein the flexible outer casing is a molded thermoplastic material.

7. The armrest of claim 6 wherein the molded thermoplastic material comprises a vinyl resin.

8. The armrest of claim 7 wherein the secondary substrate has a depending flange with an opening and the primary substrate has an alignment tab positioned in the opening.

9. The armrest of claim 8 wherein the secondary substrate has a second opening and the primary substrate is heat staked to the secondary substrate through the second opening.

10. The armrest of claim 9 wherein the secondary substrate has at least one depending locator pin and the primary substrate has at least one opening which receives the at least one depending locator pin.

11. The armrest of claim 10 wherein the mounting platform of the secondary substrate has a wedge-shaped configuration.

12. The armrest of claim 11 wherein the foam pad is formed of a vinyl resin.

13. The armrest of claim 12 wherein the secondary substrate has a generally vertical wall with at least one flange extending rearwardly therefrom, wherein the at least one flange is adapted to locate the armrest in an opening on a vehicle door.

14. The armrest of claim 13 wherein the components of the armrest are formed from recyclable materials.

15. The armrest of claim 14 wherein the primary substrate has a flexible depending detent arm adapted to locate the armrest within an opening on a vehicle door.

16. The armrest of claim 15 wherein the outer casing has a tab on an interior surface thereof which extends between a portion of the primary substrate and the secondary substrate whereby the tab wedges between the substrates and reduces vibratory noise therebetween.

17. The armrest of claim 1 and further comprising an adhesive disposed between the foam pad and the secondary substrate to secure the foam pad to the secondary substrate.

18. The armrest of claim 17 wherein the foam pad is unsecured to the flexible outer casing.

19. The armrest of claim 1 wherein the foam pad is unsecured to the flexible outer casing.

20. The armrest of claim 1 wherein the flexible outer casing is a molded thermoplastic material.

21. The armrest of claim 20 wherein the molded thermoplastic material comprises a vinyl resin.

22. The armrest of claim 1 wherein the secondary substrate has a depending flange with an opening and the primary substrate has an alignment tab positioned in the opening.

23. The armrest of claim 22 wherein the secondary substrate has a second opening and the primary substrate is heat staked to the secondary substrate through the second opening.

24. The armrest of claim 1 wherein the secondary substrate has at least one depending locator pin and the primary substrate has at least one opening which receives the at least one depending locator pin.

25. The armrest of claim 1 wherein the mounting platform of the secondary substrate has a wedge-shaped configuration.

26. The armrest of claim 1 wherein the foam pad is formed of a vinyl resin.

27. The armrest of claim 1 wherein the secondary substrate has a generally vertical wall with at least one flange extending rearwardly therefrom, wherein the at least one flange is adapted to locate the armrest in an opening on the vehicle door.

28. The armrest of claim 1 wherein the components of the armrest are formed from recyclable materials.

29. The armrest of claim 1 wherein the primary substrate has a flexible depending detent arm adapted to locate the armrest within an opening on the vehicle door.

30. The armrest of claim 1 wherein the outer casing has a tab on an interior surface thereof which extends between a portion of the primary substrate and the secondary substrate whereby the tab wedges between the substrates and reduces vibratory noise therebetween.

31. An armrest adapted to be mounted to a vehicle door comprising:

a primary substrate adapted to be mounted to a vehicle door panel;

a secondary substrate mounted to the primary substrate and defining a first recess;

a foam layer mounted to the secondary substrate within the first recess;

a flexible outer casing integrally molded to the primary substrate and forming with the primary substrate a second recess which receives the secondary substrate and the foam layer; and wherein the secondary substrate has a depending flange with an opening and the primary substrate has an alignment tab positioned in the opening.

32. The armrest of claim 31 wherein the secondary substrate has a second opening and the primary substrate is heat staked to the secondary substrate through the second opening.

33. The armrest of claim 32 wherein the secondary substrate has at least one depending locator pin and the primary substrate has at least one opening which receives the at least one depending locator pin.

34. The armrest of claim 33 wherein the secondary substrate has a wedge-shaped platform which has an upper surface which receives the foam layer.

35. The armrest of claim 34 wherein the foam layer has a substantially uniform thickness.

36. The armrest of claim 35 wherein the foam layer is formed of a vinyl resin which is die cut.

37. The armrest of claim 36 wherein the secondary substrate has a generally vertical wall with at least one flange extending rearwardly therefrom, wherein the at least one flange is adapted to locate the armrest in an opening on a vehicle door.

38. The armrest of claim 37 wherein the components of the armrest are formed from recyclable materials.

39. The armrest of claim 38 wherein the primary substrate has a flexible depending detent arm adapted to locate the armrest within an opening on a vehicle door.

40. The armrest of claim 39 wherein the outer casing has a tab on an interior surface thereof which extends between a portion of the primary substrate and the secondary substrate whereby the tab wedges between the substrates and reduces vibratory noise therebetween.

41. An armrest adapted to be mounted to a vehicle door comprising:
   a primary substrate adapted to be mounted to a vehicle door panel;
   a secondary substrate mounted to the primary substrate and defining a first recess, wherein the secondary substrate has at least one depending locator pin and the primary substrate has at least one opening which receives the at least one depending locator pin;
   a foam layer mounted to the secondary substrate within the first recess; and
   a flexible outer casing integrally molded to the primary substrate forming a second recess with the primary substrate which receives the secondary substrate and the foam layer.

42. An armrest adapted to be mounted to a vehicle door comprising:
   a primary substrate adapted to be mounted to a vehicle door panel;
   a secondary substrate mounted to the primary substrate and defining a first recess, wherein the secondary substrate has a generally vertical wall with at least one flange extending rearwardly therefrom, wherein the at least one flange is adapted to locate the armrest in an opening on the vehicle door;
   a foam layer mounted to the secondary substrate within the recess; and
   a flexible outer casing integrally molded to the primary substrate and forming with the primary substrate a second recess which receives the secondary substrate and the foam layer.

43. An armrest adapted to be mounted to a vehicle door comprising:
   a primary substrate adapted to be mounted to a vehicle door panel;
   a secondary substrate mounted to the primary substrate and defining a first recess;
   a foam layer mounted to the secondary substrate within the first recess;
   a flexible outer casing integrally molded to the primary substrate forming with the primary substrate a second recess which receives the secondary substrate and the foam layer, wherein the outer casing has a tab on an interior surface thereof which extends between a portion of the primary substrate and the secondary substrate whereby the tab wedges between the substrates and reduces vibratory noise therebetween.

44. An armrest adapted to be mounted to a vehicle door made of a door panel material comprising:
   a primary substrate adapted to be mounted to a vehicle door panel;
   a secondary substrate mounted to the primary substrate and defining a first recess;
   a foam layer mounted to the secondary substrate within the first recess;
   a flexible outer casing integrally molded to the primary substrate forming with the primary substrate a second recess which receives the secondary substrate and the foam layer; and
   wherein the primary substrate, the secondary substrate, the foam layer and the flexible outer casing are each made from a compatible recyclable synthetic resin material;
   whereby the armrest and the door panel can be recycled as a unit without separating these components.

45. The armrest of claim 44 wherein the primary substrate and the secondary substrate are formed of a thermoplastic material and the secondary substrate is heat fused to the primary substrate.

46. The armrest of claim 45 wherein the heat fusing comprises heat staking.

47. The armrest of claim 46 wherein the foam layer is adhesively secured to the secondary substrate.

48. The armrest of claim 47 wherein the foam layer is unsecured to the flexible outer casing.

49. The armrest of claim 48 wherein the flexible outer casing is a molded polyolefin resin.

50. The armrest of claim 49 wherein the primary substrate and the secondary substrate are formed of a polyolefin resin.

51. The armrest of claim 50 wherein the foam layer is formed of a foamed polyolefin resin.

52. The armrest of claim 44 wherein each of the primary substrate, the secondary substrate, the foam layer and the flexible outer casing are each made from a polyolefin resin.

53. The armrest of claim 44 wherein the foam layer is adhesively secured to the secondary substrate.

54. The armrest of claim 53 wherein the foam layer is unsecured to the flexible outer casing.

55. The armrest of claim 44 wherein the foam layer is unsecured to the flexible outer casing.

56. The armrest of claim 44 wherein the secondary substrate has a depending flange with an opening and the primary substrate has an alignment tab positioned in the opening.

57. The armrest of claim 56 wherein the secondary substrate has a second opening and the primary substrate is heat staked to the secondary substrate through the second opening.

58. The armrest of claim 44 wherein the secondary substrate has at least one depending locator pin and the primary substrate has at least one opening which receives the at least one depending locator pin.

59. The armrest of claim 44 wherein the secondary substrate has a wedge-shaped platform which has an upper surface which receives the foam layer.

60. The armrest of claim 44 wherein the foam layer has a substantially uniform thickness and is die cut from a sheet of relatively uniform thickness foam material.

61. The armrest of claim 44 wherein the secondary substrate has a generally vertical wall with at least one flange extending rearwardly therefrom, wherein the at least one flange is adapted to locate the armrest in an opening on the vehicle door.

62. The armrest of claim 44 wherein the primary substrate has a flexible depending detent arm adapted to locate the armrest within an opening on the vehicle door.

63. The armrest of claim 44 wherein the outer casing has a tab on an interior surface thereof which extends between a portion of the primary substrate and the secondary substrate whereby the tab wedges between the substrates and reduces vibratory noise therebetween.

* * * * *